(12) United States Patent
Morgantini et al.

(10) Patent No.: US 11,173,873 B2
(45) Date of Patent: *Nov. 16, 2021

(54) METHOD, SYSTEM, AND COMPUTER PROGRAM PRODUCT FOR DETECTION OF SECURELY FASTENED SEAT BELTS

(71) Applicant: International Business Machines Corporation, Armonk, NY (US)

(72) Inventors: Daniele Morgantini, Rome (IT); Stefano Bevini, Maltignano (IT); Giulia Galli, Viareggio (IT); Domenico Biondi, Naples (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,886

(22) Filed: Jan. 15, 2020

(65) Prior Publication Data

US 2020/0148164 A1 May 14, 2020

Related U.S. Application Data

(63) Continuation of application No. 16/399,892, filed on Apr. 30, 2019, now Pat. No. 10,562,491, which is a
(Continued)

(51) Int. Cl.
*B60R 22/48* (2006.01)
*B60R 21/015* (2006.01)
(Continued)

(52) U.S. Cl.
CPC .............. *B60R 22/48* (2013.01); *B60N 2/002* (2013.01); *B60R 21/01532* (2014.10);
(Continued)

(58) Field of Classification Search
CPC ............. G06K 7/0008; G06K 19/0723; G06K 7/10009; G06K 7/10366; G06K 7/10316;
(Continued)

(56) References Cited

U.S. PATENT DOCUMENTS

| 3,588,811 A | 6/1971 | Prickett |
| 6,203,059 B1 * | 3/2001 | Mazur ............... B60R 21/01534 280/735 |

(Continued)

FOREIGN PATENT DOCUMENTS

| CN | 203558034 U | 4/2014 |
| DE | 102013110017 | 3/2015 |

(Continued)

OTHER PUBLICATIONS

International Search Report and Written Opinion for International Application No. PCT/IB2018/059332, dated Feb. 6, 2019, 13 pp.
(Continued)

*Primary Examiner* — Brian Wilson
(74) *Attorney, Agent, or Firm* — Konrad Raynes Davda & Victor LLP; Rabindranath Dutta

(57) ABSTRACT

An electronic tag programmed with an identification in a seat belt assembly is identified by reading the programmed identification via an electronic device embedded in a seat. In response to identifying the electronic tag, a determination is made that an occupant has not fastened a seat belt of the seat belt assembly to secure the occupant in the seat.

20 Claims, 10 Drawing Sheets

Related U.S. Application Data continuation of application No. 15/836,678, filed on Dec. 8, 2017, now Pat. No. 10,315,620.

(51) Int. Cl.
  *H04B 5/00* (2006.01)
  *B60N 2/00* (2006.01)
  *G06K 7/10* (2006.01)
(52) U.S. Cl.
  CPC ....... *G06K 7/10366* (2013.01); *H04B 5/0025* (2013.01); *B60R 2022/4816* (2013.01)
(58) Field of Classification Search
  CPC ......... G06K 19/07749; G06K 7/10356; G06K 19/0717; G06K 7/10019; G06K 19/07758; G06K 17/00; B60R 22/48; B60R 21/01532; B60R 2022/4816; H04B 5/0025; B60N 2/002
  USPC ....................................................... 340/10.1
  See application file for complete search history.

(56) References Cited

U.S. PATENT DOCUMENTS

| | | | |
|---|---|---|---|
| 9,424,728 B2 * | 8/2016 | Rambadt | B60N 2/002 |
| 9,663,032 B1 * | 5/2017 | Appukutty | B60N 2/2803 |
| 10,315,620 B1 | 6/2019 | Morgantini et al. | |
| 10,471,930 B2 * | 11/2019 | Thomas | B60R 22/48 |
| 2008/0164682 A1 | 7/2008 | Matsuda | |
| 2012/0220213 A1 | 8/2012 | Fischer et al. | |
| 2014/0125355 A1 | 5/2014 | Grant | |
| 2015/0251618 A1 | 9/2015 | Ghannam et al. | |
| 2019/0256042 A1 | 8/2019 | Morgantini et al. | |

FOREIGN PATENT DOCUMENTS

| | | | |
|---|---|---|---|
| EP | 2189372 A1 | 5/2010 | |
| WO | 0044595 A1 | 8/2000 | |

OTHER PUBLICATIONS

Abstract and Machine Translation of CN203558034U, published on Apr. 23, 2014, Total 9 pp.
Abstract and Machine Translation for DE Publication No. 102013110017, dated Mar. 12, 2015, 46 pp.
U.S. Appl. No. 15/836,678, dated Dec. 8, 2017.
Office Action dated Aug. 24, 2018, 12 pp.,for U.S. Appl. No. 15/836,678.
Response to Office Action dated Nov. 26, 2018, 15 pp., for U.S. Appl. No. 15/836,678.
Notice of Allowance dated Jan. 30, 2019, 7 pp., for U.S. Appl. No. 15/836,678.
U.S. Appl. No. 16/399,892, dated Apr. 30, 2019.
Office Action dated Jul. 1, 2019, pp. 12, for U.S. Appl. No. 16/399,892.
Response dated Oct. 1, 2019, pp. 2, to Office Action dated Jul. 1, 2019, pp. 12, for U.S. Appl. No. 16/399,892.
Notice of Allowance dated Oct. 10, 2019, pp. 7, for U.S. Appl. No. 16/399,892.
List of IBM Patents and Applications Treated as Related, pp. 2, Jan. 15, 2020.

* cited by examiner

METHOD, SYSTEM, AND COMPUTER PROGRAM PRODUCT FOR DETECTION OF SECURELY FASTENED SEAT BELTS

CROSS-REFERENCE TO RELATED APPLICATION

This application is a continuation of U.S. patent application Ser. No. 16/399,892, filed Apr. 30, 2019, wherein U.S. patent application Ser. No. 16/399,892 is a continuation of U.S. patent application Ser. No. 15/836,678, filed Dec. 8, 2017, which applications are incorporated herein by reference in their entirety.

BACKGROUND

1. Field

Embodiments relate to a method, system, and computer program product for the detection of securely fastened seat belts.

2. Background

A seat belt system is a vehicle safety device for securing the occupant of a vehicle against movement that may result during a collision or a sudden stop. A seat belt of the seat belt system when properly fastened restricts the movement of the occupant of the seat during a collision. The occupant of the seat is prevented from being ejected and thrown around in the vehicle during the collision, and as a result the likelihood of injuries caused by impacts with interior elements of the vehicle are reduced.

The seat belt system also includes a tongue and a buckle. The tongue is a part of the seat belt system that is attached to the seat belt. The tongue fits into the buckle to secure the seat belt. The buckle is the part of the seat belt system that secures and releases the tongue.

Near-field Communication (NFC) is a set of wireless communication protocols that enable two electronic devices to establish communications, when the two electronic devices are within a predetermined distance (e.g., 10 cm) of each other. A NFC enabled tag (referred to as a NFC tag), for example a sticker or a wristband, may contain one or microchips that may store information. The NFC tag may be programmed with information, and the information stored in the NFC tag may be read by a NFC reader when the NFC reader and the NFC tag are within the predetermined distance, where the predetermined distance is also referred to as the NFC range.

SUMMARY OF THE PREFERRED EMBODIMENTS

Provided are a method, a system, a computer program product, and a vehicle in which an electronic tag programmed with an identification in a seat belt assembly is identified by reading the programmed identification via an electronic device embedded in a seat. In response to identifying the electronic tag, a determination is made that an occupant has not fastened a seat belt of the seat belt assembly to secure the occupant in the seat.

In additional embodiments, the electronic tag is a Near-field Communication (NFC) tag, wherein the electronic device is a NFC reader.

In further embodiments, a determination is made that the occupant has not fastened the seat belt of the seat belt assembly to secure the occupant in the seat, in response to determining that a NFC tag embedded in a tongue of the seat belt assembly has not been identified by a NFC reader embedded in a buckle of the seat belt assembly.

In yet additional embodiments, a determination is made that the occupant has not fastened the seat belt of the seat belt assembly to secure the occupant in the seat, in response to determining that a NFC tag embedded in a buckle of the seat belt assembly has not been identified by a NFC reader embedded in a tongue of the seat belt assembly.

In certain embodiments, a determination is made that the occupant has not fastened the seat belt of the seat belt assembly to secure the occupant in the seat, in response to determining that a NFC tag installed in the seat belt of the seat belt assembly has been identified by a NFC reader embedded within 1 cm of a front surface of a backrest of the seat.

In further embodiments, a determination is made that the occupant has not fastened the seat belt of the seat belt assembly to secure the occupant in the seat, in response to determining that a NFC tag installed in the seat belt of the seat belt assembly has been identified by a NFC reader embedded within 1 cm of a rear surface of a backrest of the seat.

In additional embodiments, a determination is made that the occupant has not fastened the seat belt of the seat belt assembly to secure the occupant in the seat, in response to determining that a NFC tag installed in the seat belt of the seat belt assembly has been identified by a NFC reader embedded within a backrest of the seat.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Vehicular accidents are one of major causes of injuries and death. The use of seat belts may substantially reduce the risk of injuries and death in vehicular accidents. Several mechanisms are in use to remind an occupant of vehicle to fasten the seat belt (e.g., via an audible indication, or via a display indication). However, in spite of such reminders there are some occupants who deliberately avoid fastening seat belts.

Some existing mechanisms to provide reminders may be activated by pressure on the seat (e.g., via seat occupancy detectors) and by verification that the tongue has been correctly inserted into the buckle. Otherwise, a loud sound may be emitted and lights on the dashboard may be activated. Certain other existing mechanisms may provide the reminders based on seat belt tension detection.

Some of the more common methods to bypass the currently employed mechanisms include: (1) obtaining an tongue (usually separately sold or retrieved from another car) that is not tied to any seat belt and inserting the obtained tongue into the buckle; (2) fastening the seat belt and then sitting on top of the fastened seat belt; and (3) wrapping the seat belt around the back of the seat and then fastening the seat belt.

Certain embodiments provide mechanisms to detect whether a seat belt has been properly fastened by using NFC tags and NFC readers.

Exemplary Embodiments

Figure 1:
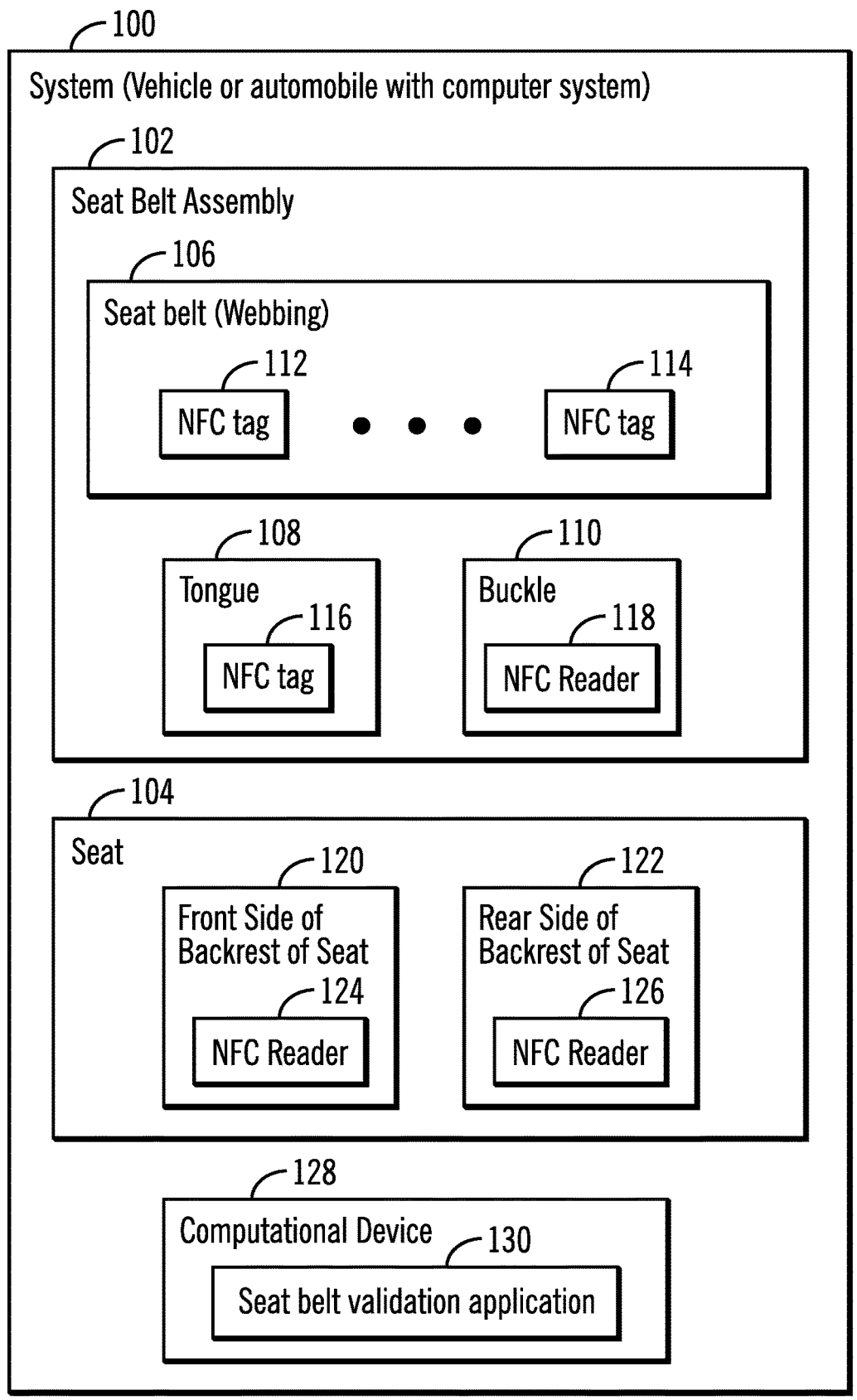
FIG. 1 illustrates a block diagram that shows components of a system that determines whether a seat belt is securely fastened, in accordance with certain embodiments.

FIG. 1 illustrates a block diagram of a system 100 that may be comprised at least of a seat belt assembly 102 and a seat 104. The seat belt assembly 102 and the seat 104 may be components of a vehicle, such as an automobile, a truck, a bus, etc. In certain alternative embodiments, the seat belt assembly 102 and the seat 104 may be components of a ship, an airplane or some other mode of conveyance equipped with a seat belt.

The seat belt assembly 102 may be comprised of a seat belt (also referred to as a webbing) 106, a tongue 108 and a buckle 110. The tongue 108 is attached to the seat belt 106, and an occupant or passenger of a vehicle may insert the tongue 108 into the buckle 110 to fasten the seat belt 106.

One or more NFC tags 112, 114 may be installed on the seat belt 106. The installation of the NFC tags 112, 114 on the seat belt 106 may be performed via embedding the NFC tags 112, 114 in the seat belt 106, or by attaching the NFC tags 112, 114 to the seat belt 106 or via some other mechanism. The term embedding may include installing inside or outside an element. A NFC tag 116 may be embedded in the tongue 108, and a NFC reader 118 may be embedded in the buckle 110. In alternative embodiments, the NFC tag 116 may be installed in the buckle 110 and the NFC reader 118 may be installed in the tongue 108.

The seat 104 has a backrest that supports the back of the person who sits on the seat 104. The backrest has a front side 120 that faces the front of the vehicle. The backrest has a rear side 122 that faces the rear of the vehicle. A NFC reader 124 is embedded in the front side 120 of the backrest, and a NFC reader 126 is embedded in the rear side 122 of the backrest.

Each of the NFC tags 112, 114, 116 is programmed with an identification (e.g., a number, a sequence of characters, a code, etc.) that when read by a NFC reader allows the NFC reader to identify the NFC tag. If a NFC reader reads the identification of a NFC tag that the NFC reader was not expecting, then the NFC reader or a computational device that interfaces with the NFC reader may determine that an unexpected NFC tag is in the proximity of the NFC reader.

The system 100 may in certain embodiments also include a computational device 128 that executes a seat belt validation application 130 implemented in software, firmware, hardware or any combination thereof. In certain embodiments the computational device 128 is external to the seat belt assembly 102 and the seat 104. In certain embodiments, each of the NFC readers 118, 124, 126 performs many of the operations of a computational device or includes elements of a computational device. The computational device 128 may comprise any suitable computational device including those presently known in the art, such as, a personal computer, a workstation, a server, a mainframe, a hand held computer, a palm top computer, a telephony device, a network appliance, a blade computer, a processing device, a controller for a vehicle, etc. The computational device 128 may interface with components of the system 100 and may control certain operations of the components of the system 100, and may also perform operations that control the movement of a vehicle in which the seat belt assembly 102 and the seat 104 are installed.

Figure 2:
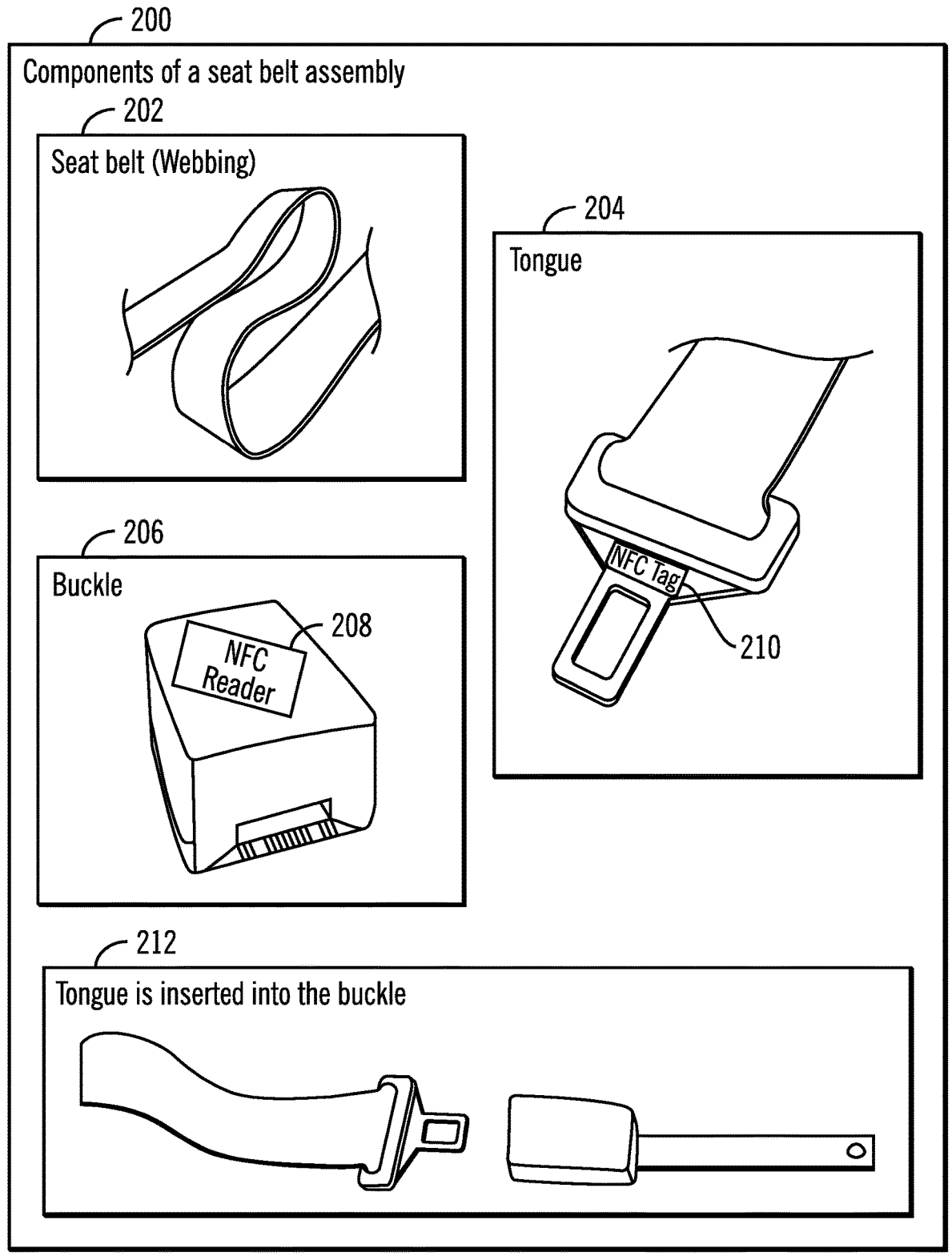
FIG. 2 illustrates a block diagram that shows components of a seat belt assembly, in accordance with certain embodiments.

FIG. 2 illustrates a block diagram 200 that shows components of a seat belt assembly 102, in accordance with certain embodiments. In FIG. 2, an exemplary seat belt 202 that corresponds to the block diagram of seat belt 106 of FIG. 1 is shown. Also, in FIG. 2, an exemplary tongue 204 that corresponds to the block diagram of the tongue 108 of FIG. 1 is shown. Additionally, in FIG. 2, an exemplary buckle 206 that corresponds to the block diagram of the buckle 110 of FIG. 1 is shown. An NFC reader 208 is shown in the buckle 206, and a NFC tag 210 is shown in the tongue 204.

Block 212 of FIG. 2 shows the tongue 204 being inserted into the buckle 206 for fastening the seat belt 202.

Figure 3:
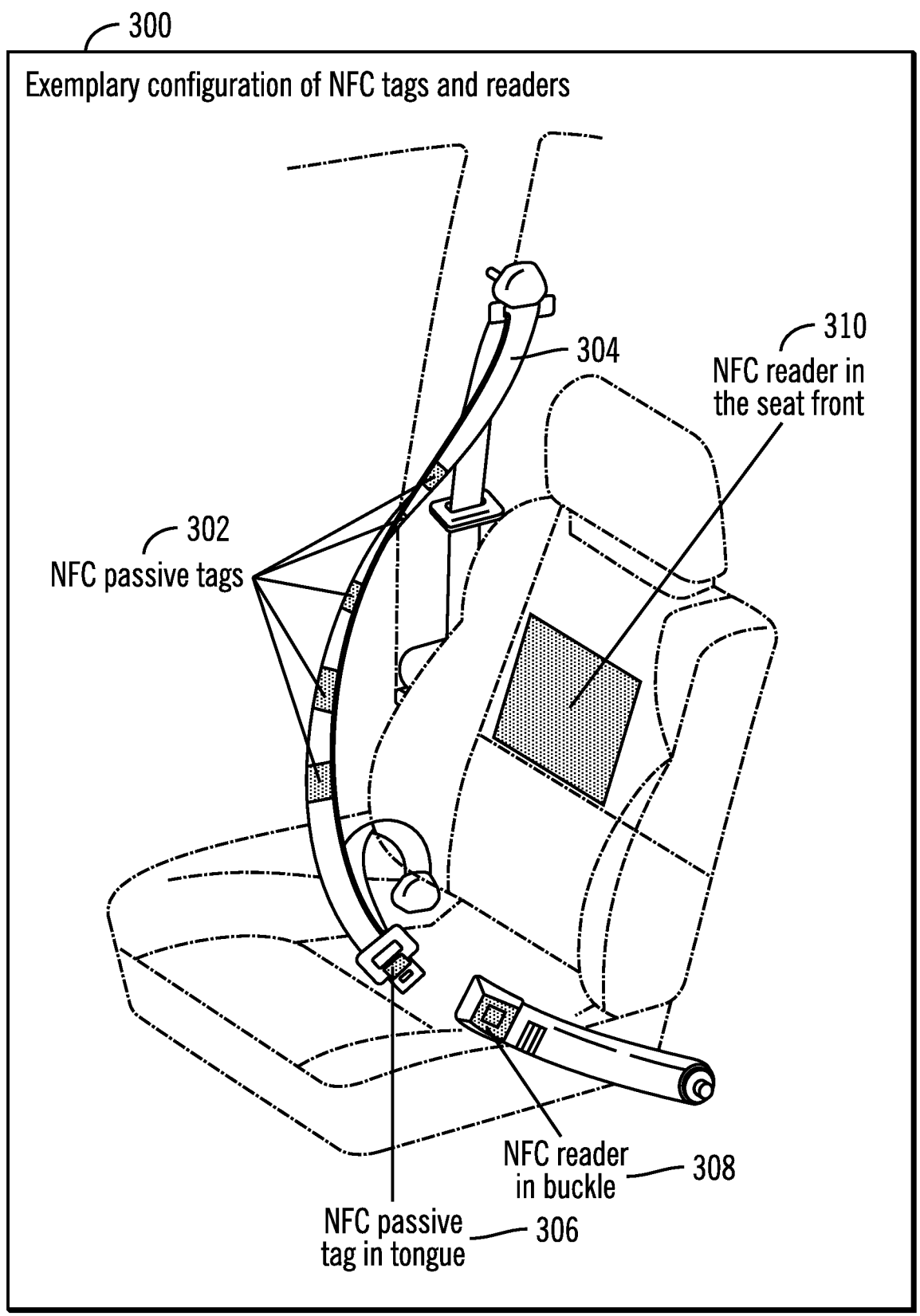
FIG. 3 illustrates a block diagram of an exemplary configuration of NFC tags and readers, in accordance with certain embodiments.

FIG. 3 illustrates a block diagram 300 of an exemplary configuration of NFC tags and readers, in accordance with certain embodiments.

NFC tags 302 (referred to as NFC passive tags because they are passive devices) are installed in the seat belt 304. A NFC tag is shown as being embedded in the tongue (via reference numeral 306). A NFC reader is shown as being embedded in the buckle (via reference numeral 308).

In FIG. 3, a NFC reader is shown embedded under the front surface of the seat backrest (via reference numeral 310). The NFC reader may be embedded as close as possible to the front surface of the seat backrest (e.g., within 1 cm. of the front surface of the seat backrest if the NFC range is less than 10 cm.). If an occupant fastens the tongue to the buckle and sits on the seat belt 304, then the proximity of one or more of the NFC tags 302 may allow the NFC reader in the seat front to read the identification of the one or more NFC tags 302, and a determination may be made that the seat belt has not been fastened securely because the occupant of the seat is sitting over a fastened seat belt rather than being restrained by the fastened seat belt.

Figure 4:
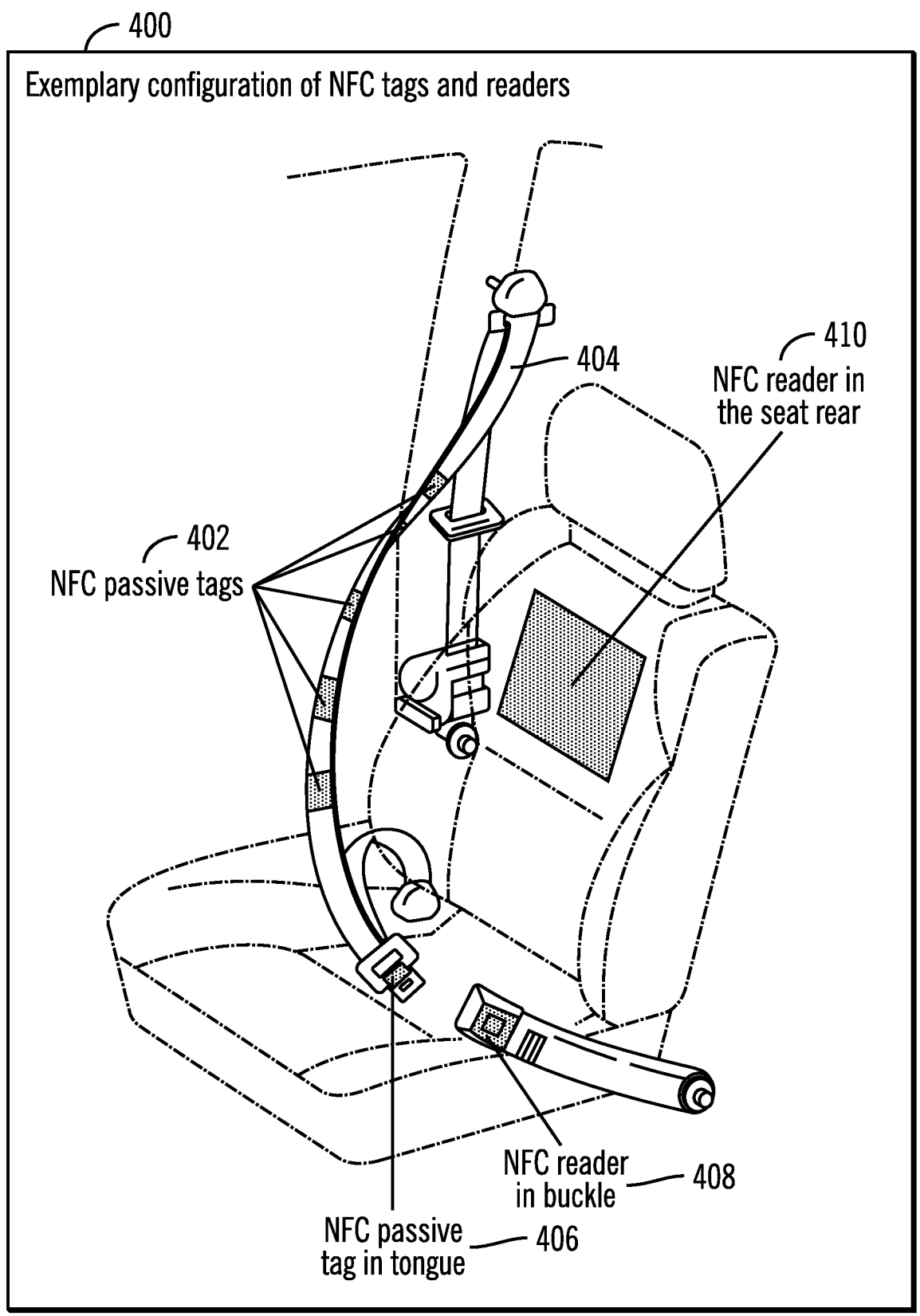
FIG. 4 illustrates a block diagram of an exemplary configuration of NFC tags and readers, in accordance with certain embodiments.

FIG. 4 illustrates a block diagram 400 of an exemplary configuration of NFC tags and readers, in accordance with certain embodiments.

NFC tags 402 (referred to as NFC passive tags because they are passive devices) are installed in the seat belt 404. A NFC tag is shown as being embedded in the tongue (via reference numeral 406). A NFC reader is shown as being embedded in the buckle (via reference numeral 408).

In FIG. 4, a NFC reader is shown embedded under the rear surface of the seat backrest (via reference numeral 410). The NFC reader may be embedded as close as possible to the rear surface of the backrest of the seat (e.g., within 1 cm. of the rear surface of the backrest of the seat if the NFC range is less than 10 cm). If an occupant fastens the tongue to the buckle by wrapping the seat belt behind the backrest of the seat, then the proximity of one or more of the NFC tags 402 may allow the NFC reader in the rear of the backrest of the seat to read the identification of the one or more NFC tags 402, and a determination may be made that the seat belt has not been fastened securely because the seat belt has been fastened by wrapping the seat belt behind the backrest of the seat.

Figure 5:
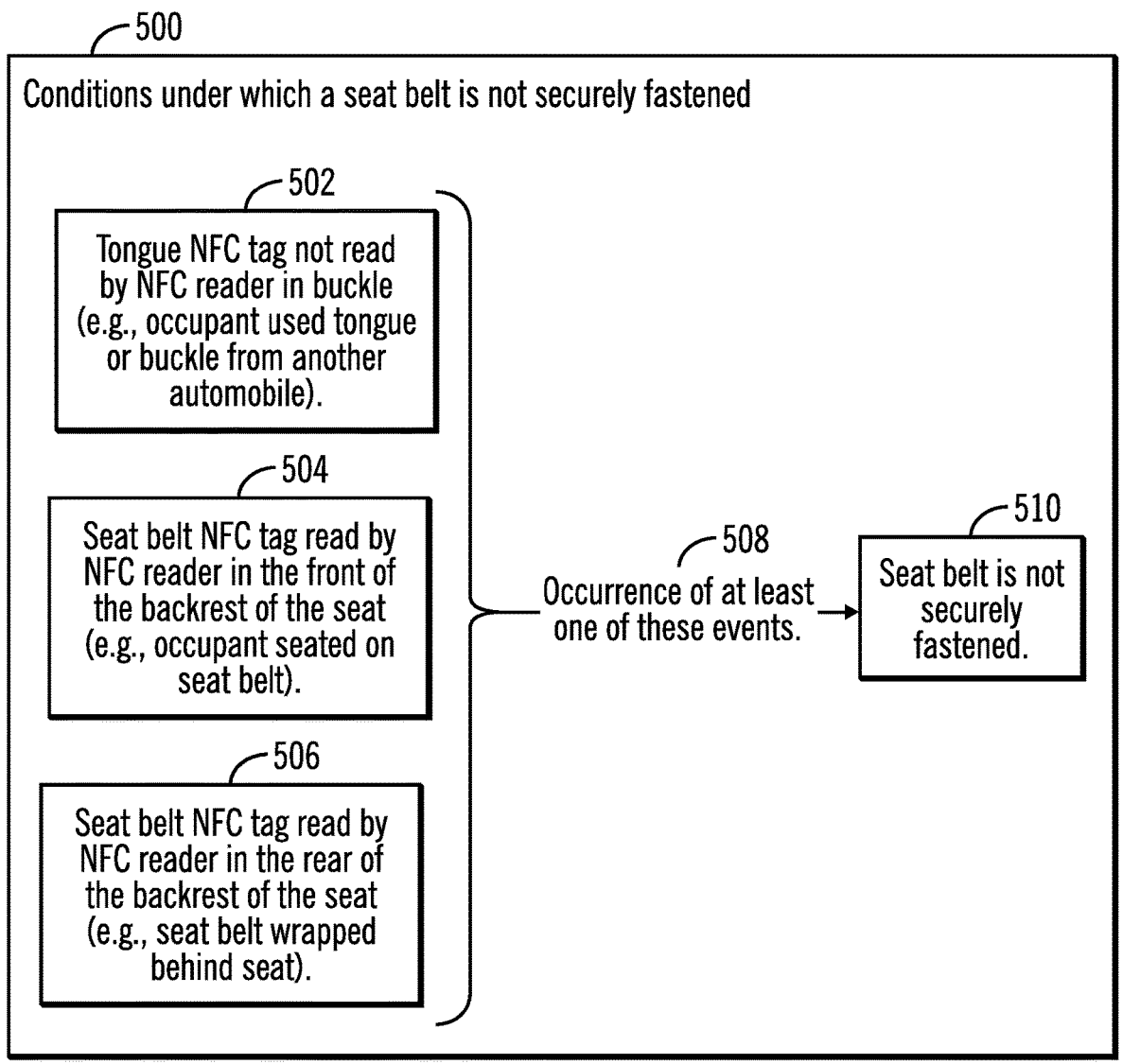
FIG. 5 illustrates a block diagram that shows conditions under which a seat belt is not securely fastened, in accordance with certain embodiments.

FIG. 5 illustrates a block diagram 500 that shows conditions under which a seat belt is not securely fastened, in accordance with certain embodiments.

If the NFC tag embedded in the tongue is not read by the NFC reader in the buckle to identify that the correct tongue and buckle combination is being used, then the seat belt is not securely fastened (shown via reference numerals 502, 508, 510). Such a condition may occur if an occupant used the tongue or buckle of another automobile to substitute the tongue or the buckle of the seat belt assembly 102.

If the NFC tag installed in the seat belt is read by the NFC reader in the front of the backrest of the seat, then the seat belt is not securely fastened (shown via reference numerals 504, 508, 510). Such a condition may occur if the occupant fastens the seat belt but is sitting on the seat belt instead of wrapping the seat belt over the body of the occupant.

If the NFC tag installed in the seat belt is read by the NFC reader in the rear of the backrest of the seat, then the seat belt is not securely fastened (shown via reference numerals 506, 508, 510). Such a condition may occur if the occupant fastens the seat belt by wrapping the seat belt behind the rear of the seat, instead of wrapping the seat belt over the body of the occupant.

Figure 6:
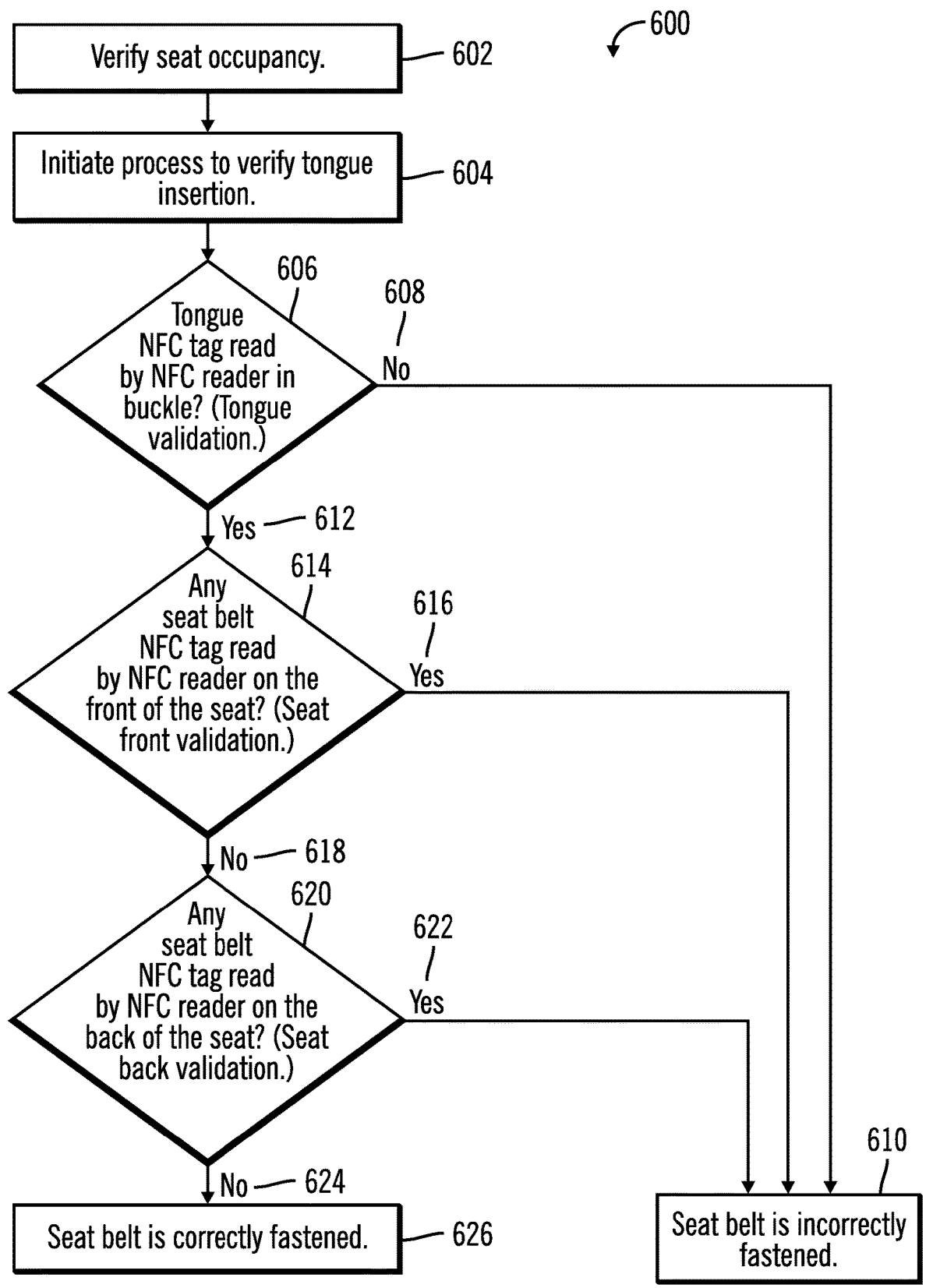
FIG. 6 illustrates a first flowchart that shows operations for detecting securely fastened seat belts, in accordance with certain embodiments.

FIG. 6 illustrates a flowchart 600 that shows operations for detecting securely fastened seat belts, in accordance with certain embodiments.

Control starts at block 602 in which the system (e.g. system 100) verifies that the seat 104 is occupied (e.g., by determining whether a pressure sensor detects an adequate weight corresponding to a seated occupant on the seat). Then the system initiates the process to verify tongue insertion (at block 604). At block 606, the system determines whether the NFC tag 116 of the tongue is read by the NFC reader 118 of the buckle 110 to determine whether the identification of the NFC tag 116 matches the identification expected by the NFC reader 118. If not ("No" branch 608) control proceeds to block 610 in which a determination is made that the seat belt is incorrectly fastened.

If at block 606 it is determined that the identification of the NFC tag 116 matches the identification expected by the NFC reader 118 ("Yes" branch 612) then control proceeds to block 614 in which the system determines whether any NFC tag 112, 114 on the seat belt is read by the NFC reader 124 on the front of the seat. If so ("Yes" branch 616) control proceeds to block 610 and it is determined that the seat belt is incorrectly fastened.

If at block 614, the system determines that no NFC tag 112, 114 on the seat belt is read by the NFC reader 124 on the front of the seat ("No" branch 618) then control proceeds to block 620 in which the system determines whether any NFC tag 112, 114 on the seat belt 106 is read by the NFC reader 126 on the back of the seat. If so ("Yes" branch 622) control proceeds to block 610 and it is determined that the seat belt is incorrectly fastened.

If at block 620, the system determines that no NFC tag 112, 114 on the seat belt is read by the NFC reader 126 on the back of the seat ("No" branch 624) then control proceeds to block 626 in which the system determines that the seat belt is properly fastened.

Therefore, FIG. 6 illustrates certain embodiments in which the system determines whether an occupant of a seat has correctly or incorrectly (i.e., securely or insecurely) fastened the seat belt based on tongue validation (at block 606), seat front validation (at block 614) and seat back validation (block 620).

Figure 7:
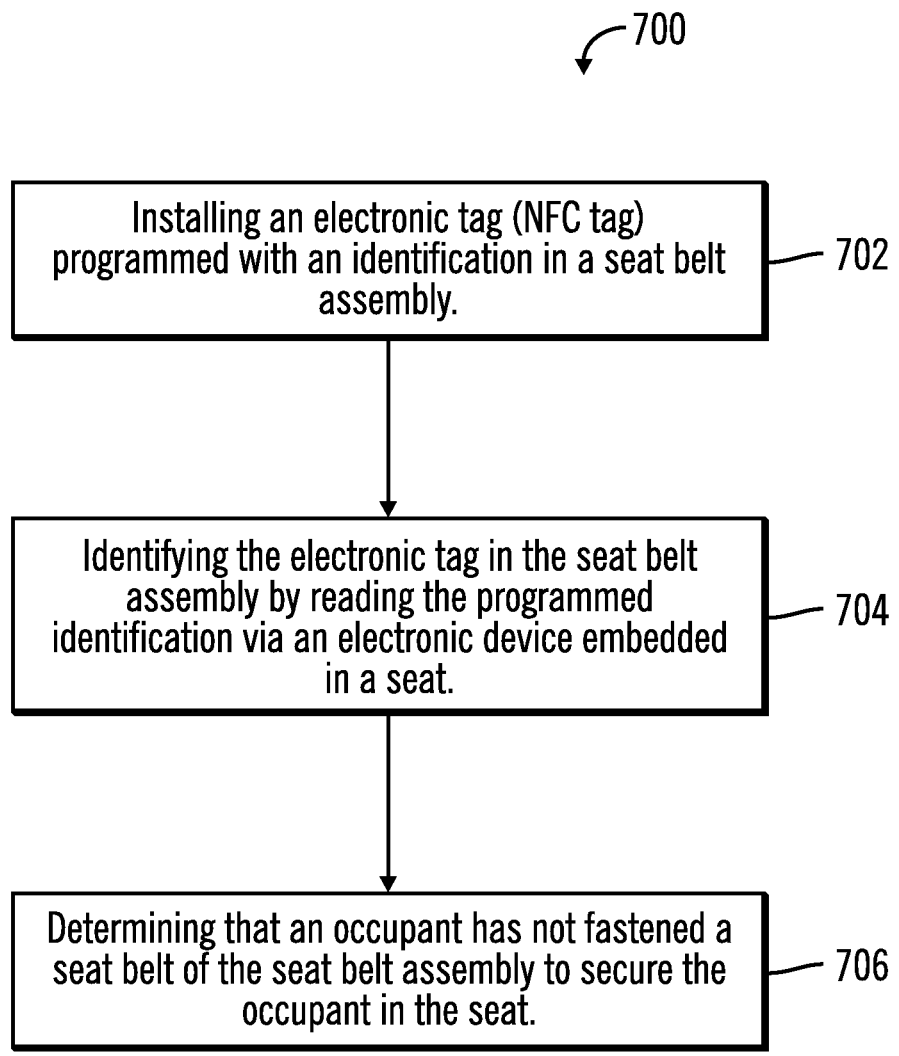
FIG. 7 illustrates a second flowchart that shows operations for detecting securely fastened seat belts, in accordance with certain embodiments

FIG. 7 illustrates a second flowchart that 700 shows operations for detecting securely fastened seat belts, in accordance with certain embodiments.

Control starts at block 702 in which an electronic tag (e.g., a NFC tag) is installed in a seat belt assembly, where the electronic tag is programmed with an identification. The electronic tag is identified in the seat belt assembly by reading the programmed identification via an electronic device embedded in a seat (at block 704), and a determination is made (at block 706) that an occupant has not fastened a seat belt of the seat belt assembly to secure the occupant in the seat.

Therefore, FIG. 1-7 illustrate certain embodiments in which a system to detect good use of a seat belt is provided, the seat having a sensor detecting pressure on the seat (seat occupancy detector) and a subsystem detecting that a male buckle end (e.g., a tongue) has been correctly inserted into the female buckle end (e.g., a buckle). The system may include a male connector (i.e., tongue) validation subsystem. The male connector, which has a NFC tag embedding a unique identifier, is inserted into the female connector (i.e., buckle). The buckle can read the identifier of the NFC tag and verify if the NFC tag belongs to the tongue it is paired to. This buckle-tongue pairing determination assures that an extra loose tongue is not inserted into the buckle The system may include a seat back negative validation subsystem. The belt has several NFC tags embedded (e.g., sewn over or placed inside) in the belt, while a NFC reader is placed inside the back of the seat. The NFC reader is not supposed to read any NFC tag unless the seat belt is misplaced on the back of the seat. Therefore to pass the validation the system must yield a negative result. This ensures that the users have placed their body between the seat and the seat belt.

The system may include a seat front negative validation subsystem. An NFC reader is also placed inside the front side of the seat (if it is powerful enough then the same NFC reader may be used for both seat back and front validation). If the seat belt is correctly fastened, the body prevents the NFC reader from reading any NFC tag. This validation is an effective way to stop people from fastening the seat belt and then sitting on top of the seat belt.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
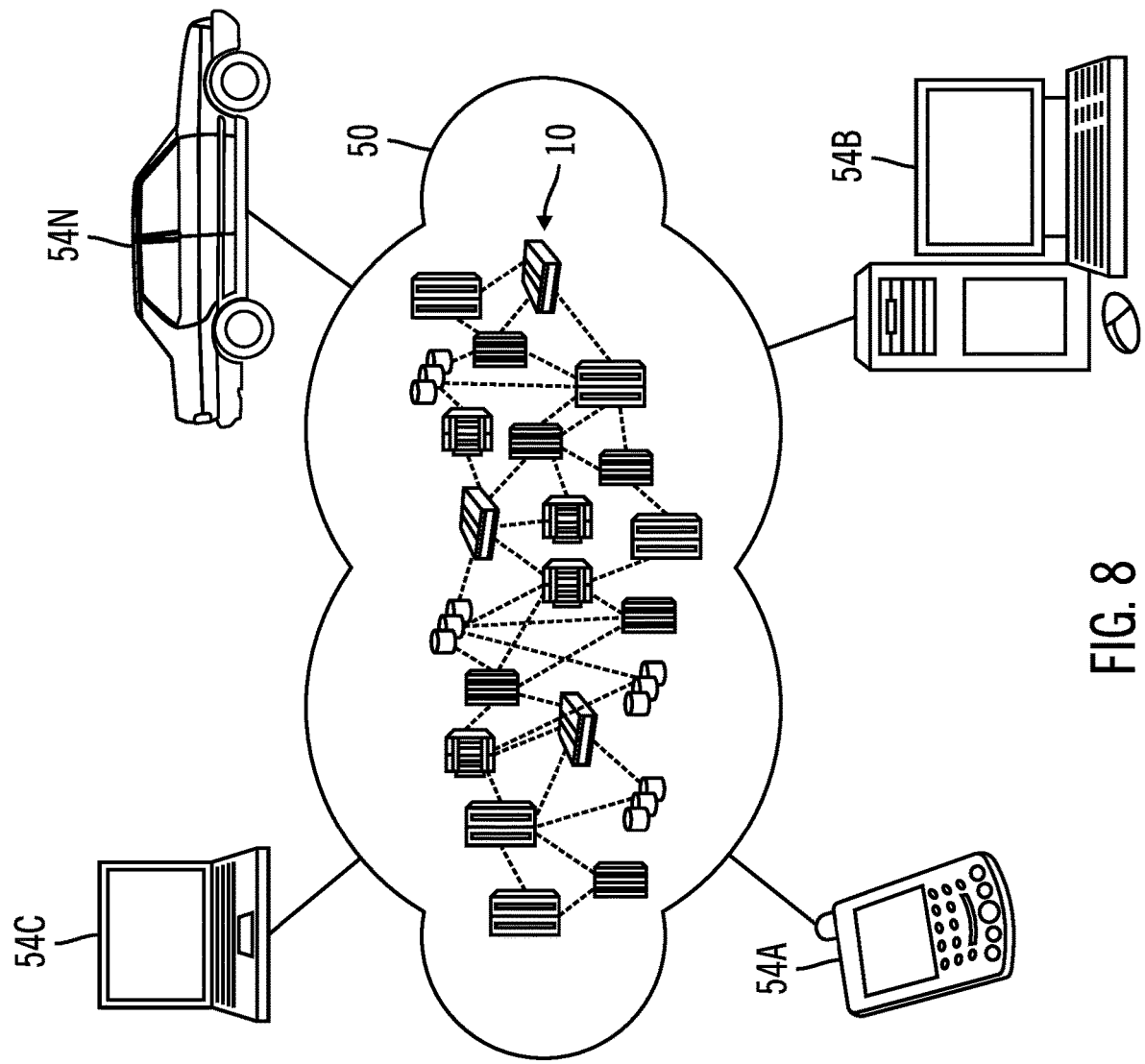
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
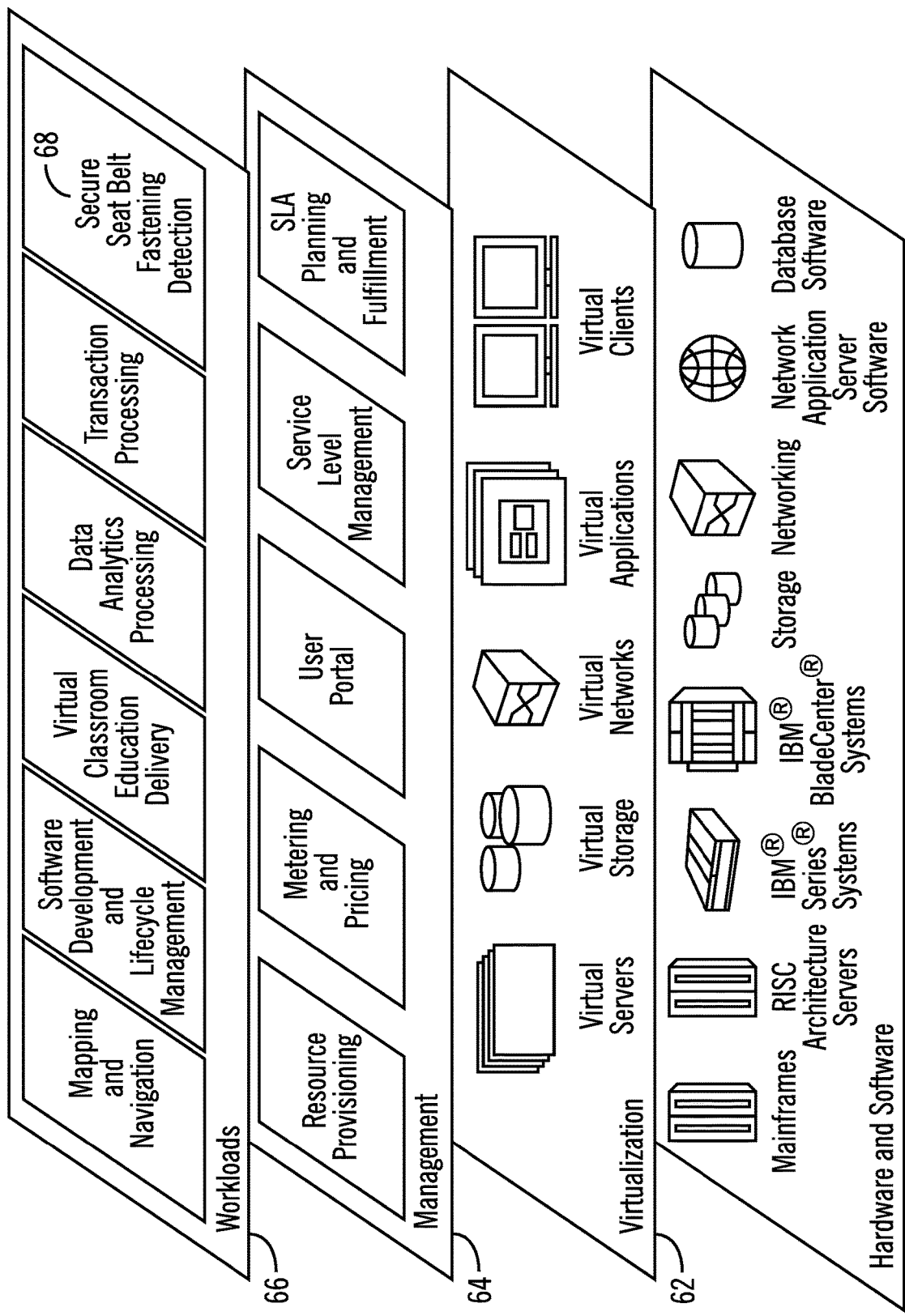
FIG. 9 illustrates a block diagram of further details of the cloud computing environment of FIG. 8, in accordance with certain embodiments.

Referring now to FIG. 9 a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and secure seat belt fastening detection 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
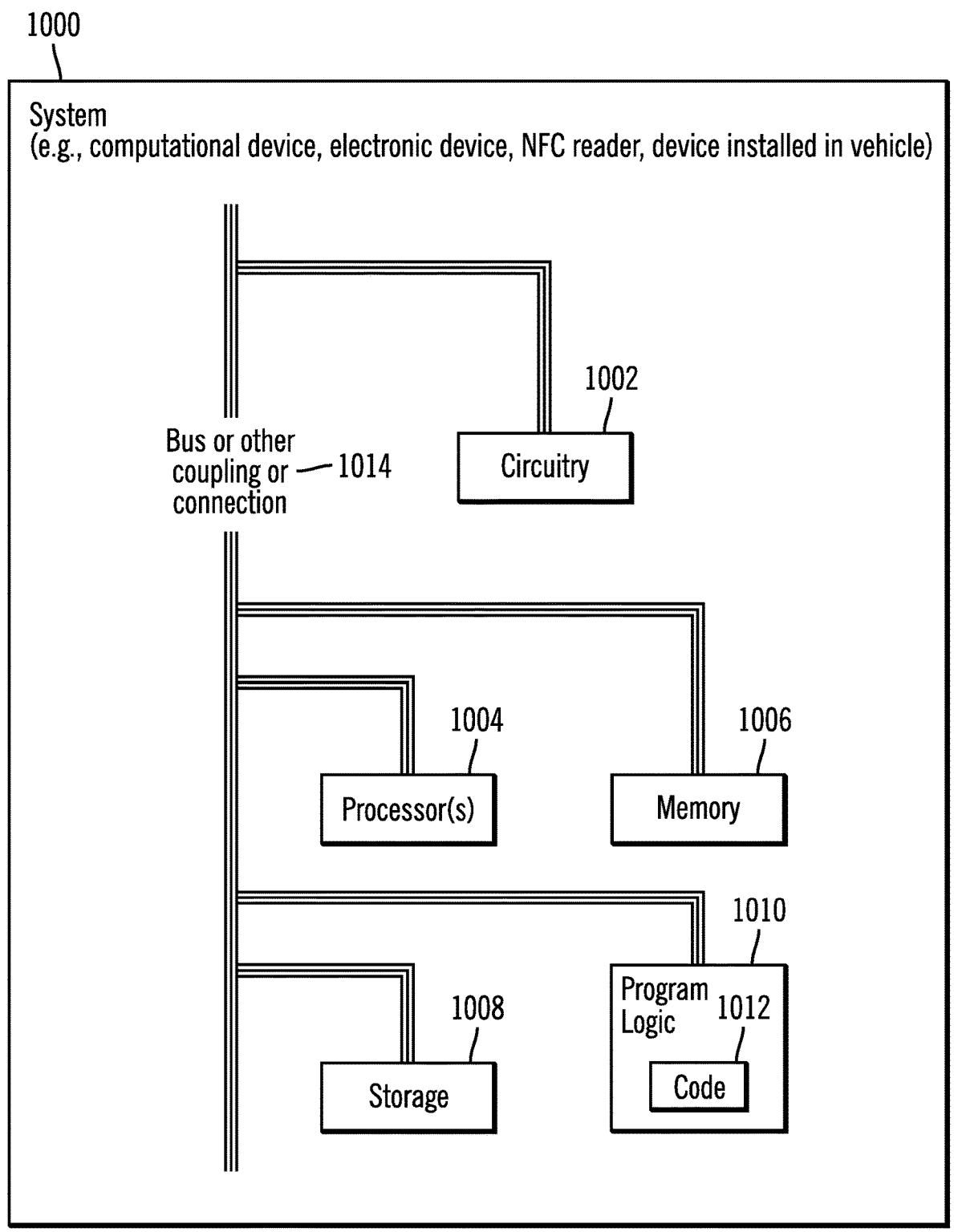
FIG. 10 illustrates a block diagram of a system that shows certain elements that may be included in the components of the systems described in FIGS. 1-9, in accordance with certain embodiments.

FIG. 10 illustrates a block diagram that shows certain elements that may be included in a system 1000 that comprises a computational device, an electronic device, a NFC reader, a device installed in a vehicle, or other computational devices in accordance with certain embodiments. The system 1000 may include components shown in FIG. 1 or may include the system shown in FIG. 1. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   determining whether an electronic tag installed in a seat belt of a seat belt assembly of a vehicle has been identified by a first electronic device embedded within 1 cm of a front surface of a backrest of a seat of the vehicle;
   in response to determining that the electronic tag installed in the seat belt of the seat belt assembly of the vehicle has been identified by the first electronic device embedded within 1 cm of the front surface of the backrest of the seat of the vehicle, determining that the seat belt is incorrectly fastened, wherein by determining that the seat belt is incorrectly fastened a determining of whether the electronic tag has been identified by a second electronic device embedded within 1 cm of a rear surface of the backrest is avoided;
   in response to determining that the electronic tag installed in the seat belt of the seat belt assembly of the vehicle has not been identified by the first electronic device embedded within 1 cm of the front surface of the backrest of the seat of the vehicle, determining whether the electronic tag has been identified by the second electronic device embedded within 1 cm of the rear surface of the backrest;
   in response to determining that the electronic tag has been identified by the second electronic device embedded within 1 cm of the rear surface of the backrest, determining that the seat belt is incorrectly fastened; and
   in response to determining that the electronic tag has not been identified by the second electronic device embedded within 1 cm of the rear surface of the backrest, determining that an occupant of the vehicle has fastened the seat belt to secure the occupant in the seat.

2. The method of claim 1, wherein the electronic tag is a Near-field Communication (NFC) tag.

3. The method of claim 1, wherein the occupant has fastened the seat belt but is sitting on top of the fastened seat belt.

4. The method of claim 1, wherein the occupant has wrapped the seat belt around the backrest of the seat and then fastened the seat belt.

5. A system, comprising:
   an electronic tag installed in a seat belt of a seat belt assembly of a vehicle;
   a first electronic device embedded within 1 cm of a front surface of a backrest of a seat of the vehicle; and
   a second electronic device embedded within 1 cm of a rear surface of the backrest, wherein the system performs operations, the operations comprising:
   determining whether the electronic tag installed in the seat belt of the seat belt assembly of the vehicle has been identified by the first electronic device embedded within 1 cm of the front surface of the backrest of the seat of the vehicle;
   in response to determining that the electronic tag installed in the seat belt of the seat belt assembly of the vehicle has been identified by the first electronic device embedded within 1 cm of the front surface of the backrest of the seat of the vehicle, determining that the seat belt is incorrectly fastened, wherein by determining that the seat belt is incorrectly fastened a determining of whether the electronic tag has been identified by the second electronic device embedded within 1 cm of the rear surface of the backrest is avoided;
   in response to determining that the electronic tag installed in the seat belt of the seat belt assembly of the vehicle has not been identified by the first electronic device embedded within 1 cm of the front surface of the backrest of the seat of the vehicle, determining whether the electronic tag has been identified by the second electronic device embedded within 1 cm of the rear surface of the backrest;
   in response to determining that the electronic tag has been identified by the second electronic device embedded within 1 cm of the rear surface of the backrest, determining that the seat belt is incorrectly fastened; and
   in response to determining that the electronic tag has not been identified by the second electronic device embedded within 1 cm of the rear surface of the backrest, determining that an occupant of the vehicle has fastened the seat belt to secure the occupant in the seat.

6. The system of claim 5, wherein the electronic tag is a Near-field Communication (NFC) tag.

7. The system of claim 5, wherein the occupant has fastened the seat belt but is sitting on top of the fastened seat belt.

8. The system of claim 5, wherein the occupant has wrapped the seat belt around the backrest of the seat and then fastened the seat belt.

9. A computer program product, the computer program product comprising a computer readable storage medium having computer readable program code embodied therewith, the computer readable program code configured to perform operations on a processor, the operations comprising:
determining whether an electronic tag installed in a seat belt of a seat belt assembly of a vehicle has been identified by a first electronic device embedded within 1 cm of a front surface of a backrest of a seat of the vehicle;
in response to determining that the electronic tag installed in the seat belt of the seat belt assembly of the vehicle has been identified by the first electronic device embedded within 1 cm of the front surface of the backrest of the seat of the vehicle, determining that the seat belt is incorrectly fastened, wherein by determining that the seat belt is incorrectly fastened a determining of whether the electronic tag has been identified by a second electronic device embedded within 1 cm of a rear surface of the backrest is avoided;
in response to determining that the electronic tag installed in the seat belt of the seat belt assembly of the vehicle has not been identified by the first electronic device embedded within 1 cm of the front surface of the backrest of the seat of the vehicle, determining whether the electronic tag has been identified by the second electronic device embedded within 1 cm of the rear surface of the backrest
in response to determining that the electronic tag has been identified by the second electronic device embedded within 1 cm of the rear surface of the backrest, determining that the seat belt is incorrectly fastened; and
in response to determining that the electronic tag has not been identified by the second electronic device embedded within 1 cm of the rear surface of the backrest, determining that an occupant of the vehicle has fastened the seat belt to secure the occupant in the seat.

10. The computer program product of claim 9, wherein the electronic tag is a Near-field Communication (NFC) tag.

11. The computer program product of claim 9, wherein the occupant has fastened the seat belt but is sitting on top of the fastened seat belt.

12. The computer program product of claim 9, wherein the occupant has wrapped the seat belt around the backrest of the seat and then fastened the seat belt.

13. A system, comprising:
a memory; and
a processor coupled to the memory, wherein the processor performs operations, the operations comprising:
determining whether an electronic tag installed in a seat belt of a seat belt assembly of a vehicle has been identified by a first electronic device embedded within 1 cm of a front surface of a backrest of a seat of the vehicle;
in response to determining that the electronic tag installed in the seat belt of the seat belt assembly of the vehicle has been identified by the first electronic device embedded within 1 cm of the front surface of the backrest of the seat of the vehicle, determining that the seat belt is incorrectly fastened, wherein by determining that the seat belt is incorrectly fastened a determining of whether the electronic tag has been identified by a second electronic device embedded within 1 cm of a rear surface of the backrest is avoided;
in response to determining that the electronic tag installed in the seat belt of the seat belt assembly of the vehicle has not been identified by the first electronic device embedded within 1 cm of the front surface of the backrest of the seat of the vehicle, determining whether the electronic tag has been identified by the second electronic device embedded within 1 cm of the rear surface of the backrest;
in response to determining that the electronic tag has been identified by the second electronic device embedded within 1 cm of the rear surface of the backrest, determining that the seat belt is incorrectly fastened; and
in response to determining that the electronic tag has not been identified by the second electronic device embedded within 1 cm of the rear surface of the backrest, determining that an occupant of the vehicle has fastened the seat belt to secure the occupant in the seat.

14. The system of claim 13, wherein the electronic tag is a Near-field Communication (NFC) tag.

15. The system of claim 13, wherein the occupant has fastened the seat belt but is sitting on top of the fastened seat belt.

16. The system of claim 13, wherein the occupant has wrapped the seat belt around the backrest of the seat and then fastened the seat belt.

17. A vehicle, comprising:
an electronic tag installed in a seat belt of a seat belt assembly of the vehicle;
a first electronic device embedded within 1 cm of a front surface of a backrest of a seat of the vehicle; and
a second electronic device embedded within 1 cm of a rear surface of the backrest, wherein a system in the vehicle performs operations, the operations comprising:
determining whether the electronic tag installed in the seat belt of the seat belt assembly of the vehicle has been identified by the first electronic device embedded within 1 cm of the front surface of the backrest of the seat of the vehicle;
in response to determining that the electronic tag installed in the seat belt of the seat belt assembly of the vehicle has been identified by the first electronic device embedded within 1 cm of the front surface of the backrest of the seat of the vehicle, determining that the seat belt is incorrectly fastened, wherein by determining that the seat belt is incorrectly fastened a determining of whether the electronic tag has been identified by the second electronic device embedded within 1 cm of the rear surface of the backrest is avoided;
in response to determining that the electronic tag installed in the seat belt of the seat belt assembly of the vehicle has not been identified by the first electronic device embedded within 1 cm of the front surface of the backrest of the seat of the vehicle, determining whether the electronic tag has been identified by the second electronic device embedded within 1 cm of the rear surface of the backrest;
in response to determining that the electronic tag has been identified by the second electronic device embedded within 1 cm of the rear surface of the backrest, determining that the seat belt is incorrectly fastened; and
in response to determining that the electronic tag has not been identified by the second electronic device embedded within 1 cm of the rear surface of the backrest, determining that an occupant of the vehicle has fastened the seat belt to secure the occupant in the seat.

18. The vehicle of claim 17, wherein the electronic tag is a Near-field Communication (NFC) tag.

19. The vehicle of claim 17, wherein the occupant has fastened the seat belt but is sitting on top of the fastened seat belt.

20. The vehicle of claim 17, wherein the occupant has wrapped the seat belt around the backrest of the seat and then fastened the seat belt.

* * * * *